United States Patent

[11] 3,536,262

| [72] | Inventor | Robert Henri Georges Hachard<br>L'Hay-les-roses, France |
|---|---|---|
| [21] | Appl. No. | 762,027 |
| [22] | Filed | Sept. 24, 1968 |
| [45] | Patented | Oct. 27, 1970 |
| [73] | Assignee | Societe Nationale D'Etude Et De<br>Construction De Moteurs D'Aviation<br>Paris, France<br>a company of France |
| [32] | Priority | Sept. 25, 1967 |
| [33] | | France |
| [31] | | 122,181 |

[54] DEVICES FOR COAXIALLY SECURING AN INNER BODY WITHIN AN OUTER CASING
8 Claims, 4 Drawing Figs.

[52] U.S. Cl. .................................................. 239/265.19,
239/265.37
[51] Int. Cl. ..................................................... B63h 11/10

[50] Field of Search ............................................ 239/265.37,
265.35, 265.33, 265.19; 60/232

[56] References Cited
UNITED STATES PATENTS

| 3,352,494 | 11/1967 | Colville et al. | 239/265.33X |
| 3,372,876 | 3/1968 | Colville et al. | 239/265.35 |
| 3,436,020 | 4/1969 | Duthion et al. | 239/265.19X |

Primary Examiner—Lloyd L. King
Attorney—Watson, Cole, Grindle and Watson

ABSTRACT: A device for coaxially securing an inner body within an outer casing, the device including an intermediate supporting structure mounted coaxially inside the inner body and supporting this latter, as well as at least two groups of struts inclined in relation to the axis of the inner body and linking the outer casing to the intermediate supporting structure, the said supporting structure including at least two parts capable of performing a relative axial movement.

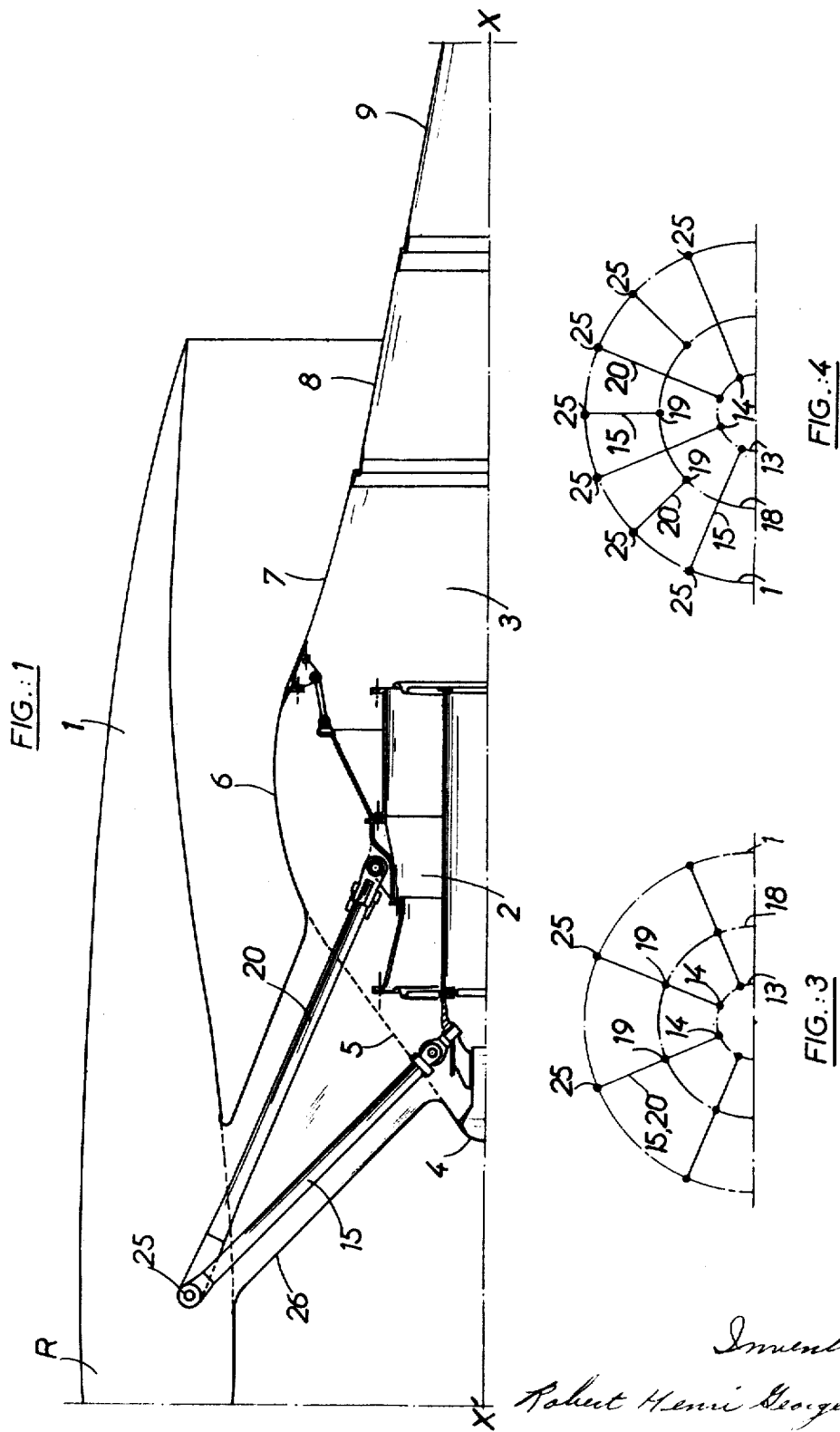

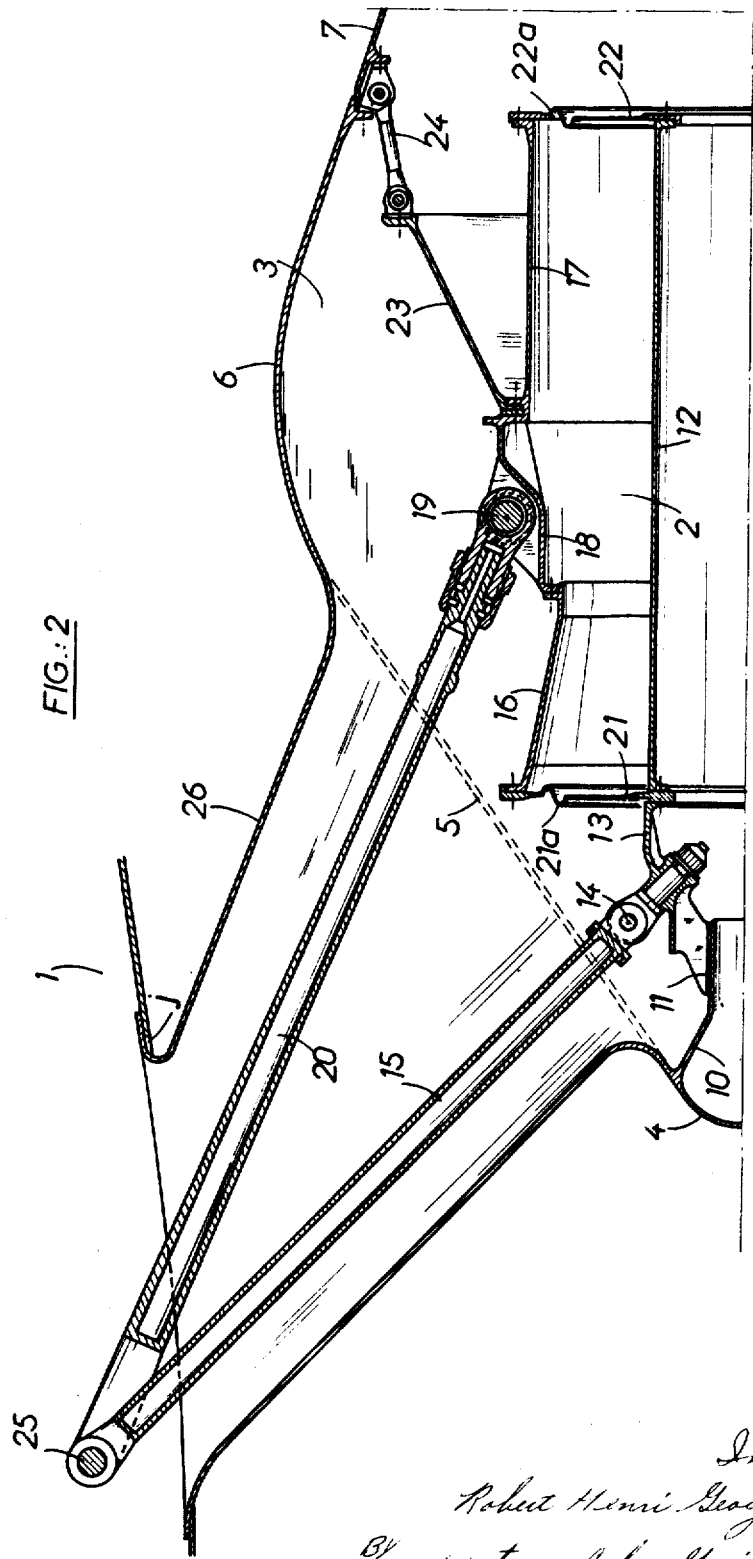

DEVICES FOR COAXIALLY SECURING AN INNER BODY WITHIN AN OUTER CASING

BACKGROUND OF THE INVENTION

The invention relates to the coaxial securing of an inner body within an outer casing, such as a chamber or duct, and more especially but not exclusively concerns the mounting of an inner intake or exhaust cone inside of peripheral casing, the assembly forming an air intake or an exhaust nozzle for the gases in a jet propulsion engine, as described, for instance, in U.S. Pat. No. 3,424,384 to Lacombe.

The mounting of heavy and voluminous inner bodies inside an outer casing sets presents awkward problems in respect of the resistance strength of the materials, especially when the assembly undergoes high temperatures which vary with time and situation.

For instance, in the case of a jet engine exhaust nozzle with an inner body, very considerable constraints may arise by reason of stresses of a static or dynamic nature and of mechanical, aerodynamic or thermal origin (due, more particularly, to phenomena connected with differential expansion) which arise in the various parts which make up the nozzle. The said constraints may in their turn bring about serious deformations which are, more particularly, likely to compromise the centering of the inner body inside the outer casing and, consequently, the magnitude and the direction of the jet thrust.

SUMMARY OF THE INVENTION

An object of the invention is to bring about a mechanically highly resistant mounting arrangement which will allow the thermal expansions that occur to develop freely without occasioning any uncontrolled deformation of the constituent parts of the assembly and which will guarantee a strictly central position of the inner body, displacements of this inner body being possible only along the longitudinal axis of the assembly.

The invention arises out of an already known securing device which comprises an intermediate supporting structure mounted coaxially inside the inner body and giving it support, as well as linking pieces between the outer casing and the said intermediate supporting structure.

According to the invention, the said linking pieces comprise at least two groups of struts inclined in relation to the axis of the inner body and each hinged at one of their terminations to the outer casing and at the other termination to the intermediate supporting structure, the latter including at least two parts capable of performing a relative axial movement and to which there are fastened the terminations of the struts of respectively the first and the second group, the fastening being effected with an axial staggering of one group in relation to the other group.

As will be seen hereinafter, this arrangement renders it possible to absorb without damage the differential expansions having their origin in the system of struts and also in the inner body and the outer casing.

According to one arrangement of the invention, the two parts of the intermediate supporting structure may be made up of substantially cylindrical or prismatic elements mounted inside the inner body coaxially with the latter and with the outer casing.

According to a particularly advantageous feature of the invention, one of the parts of the intermediate supporting structure is attached so as to slide on the inner body, whereas the other part is connected with the said inner body, preferably through the agency of a series of small articulated rods. This arrangement more especially has the advantage that it renders the mounting arrangement almost insensitive to stresses, in particular those with a termal or aerodynamic origin, arising in the inner body.

According to another feature of the invention, the two parts of the intermediate supporting structure are interlinked by resilient diaphragms which, if so required, may be provided with corrugations.

According to a further feature, the struts of the two groups are hinged to the outer casing in such a way as to possess, in a paired fashion, a common hinge point and by this means to constitute a triangulated system.

According to one modification, the struts of the two groups are hinged to the outer casing in such a way as to be distributed in an alternating pattern.

The following description, referring to the accompanying drawing and given by way of nonlimitative preferred example, indicates how the invention may be carried into practice. In the drawings:

BRIEF DESCRIPTION OF THE DRAWING

FIG. 1 is a schematic view comprising a longitudinal section through the rear portion of a jet propulsion engine fitted with an exhaust nozzle having an inner body, and showing one device in accordance with the invention for mounting the inner body within the remainder of the nozzle;

FIG. 2 is a view comprising a longitudinal section, drawn on a larger scale, through the mounting arrangement of FIG. 1;

FIGS. 3 and 4 are schematic views each comprising a cross section through the mounting arrangement and respectively showing the distribution of certain of the elements of the arrangement according to two differing modifications.

DESCRIPTION OF A PREPARED EMBODIMENT

FIG. 1 shows a jet engine R terminating towards the rear in an exhaust nozzle. The latter comprises a peripheral outer casing 1 which cooperates with an inner body 3, the two elements defining an annular duct, for example a convergent-divergent duct, through which the gases forming the propulsion stream escape.

More precisely, the invention relates to the securing or mounting of the said inner body within the outer casing 1 with the assistance of an intermediate supporting structure 2 mounted coaxially inside the inner body and supporting the latter, the securing means in accordance with the invention rendering it possible to absorb without damage the expansions or deformations enumerated hereinbefore.

The inner body 3 comprises, proceeding from the front towards the rear, a nose 4, an intake cone 5, and an annular member 6 defining the nozzle throat, the said parts being preferably soldered one to another, then a first exhaust cone member 7, a second exhaust cone member 8, both capable of being successively bolted to the aforementioned parts and, finally, a terminating pointed unit 9, preferably welded to the cone member 8.

As is shown on a larger scale in FIG. 2, the nose 4 includes, towards the inside, an extension or mandrel 10 forming a guide block for a sleeve 11 which constitutes a part of the intermediate supporting structure 2 whose construction will be described hereinafter.

The said structure essentially comprises:

a central fitting 12 which is substantially cylindrical and is bolted at one of its ends to a first supporting element 13 of a cylindro-conic general form, the said element, rigid with the sleeve 11, carrying, distributed around its periphery, a series of yokes 14 intended, as will be seen hereinafter, to receive the hinge means of struts 15 belonging to a first group;

a peripheral fitting which is substantially cylindrical, is coaxial with the first fitting and includes two formed ring members 16, 17 bolted on either side of a second cylindro-conic supporting element 18, this latter being furnished, distributed around its periphery, with a series of hinge devices 19 intended to fasten on to struts 20 belonging to a second group;

two flexible metal diaphragms 21, 22 each in the general form of a circular disc, carrying corrugations 21a, 22a and attached (preferably by bolt means), at their inner peripheries to the central fitting 12, 13 and at their outer peripheries to the peripheral fitting 16, 17, 18.

The integrating of the inner body 3 with the intermediate supporting structure 2 is effected, on the one hand, by a truncated-cone element 23 bolted at one of its ends to the peripheral fitting 16, 17, 18 which forms a part of the said structure, and rigid at its other end with the exhaust cone member 7 through the agency of small articulated rods 24; the integrating is effected, on the other hand, by the sleeve 11, described hereinbefore and mounted in such a manner as to be capable of sliding on the mandrel 10 of the nose 4 of the inner body.

The intermediate supporting structure, made rigid by this means with the inner body, is held in position, proceeding from the outer casing 1, by means of struts 15, 20 distributed uniformly in two groups in the annular space which separates the outer casing from the inner body.

In the example shown in FIGS. 1, 2 and 3, the struts 15 and 20 are hinged in pairs at 25 on the outer casing 1 in such a manner that each group of hinges 14, 19, 25 is located in an identical axial plane. By this means there is obtained a triangulated system extending outwards around the inner body. But this arrangement is not mandatory: in fact, the struts 15, 20 may well not be, taken pair by pair, in a coplanar relationship, and they may, on the contrary, have an alternating distribution pattern as illustrated schematically in FIG. 4.

Faired hollow arms 26 connect the outer casing 1 to the inner body. In themselves, they play no part in the suspending of the centrebody, and they merely serve to provide a correct contour to the flow of the gases around the struts 15, 20.

The component elements of the nozzle (the outer casing, the inner body and the device for supporting said inner body from said outer casing) are subject to a group of constraints that are due both to the static and dynamic stresses of mechanical or aerodynamic origin being exerted on the said elements and to phenomena connected with differential expansions of thermal origin, to which phenomena the mounting or supporting arrangement is particularly sensitive by reason, more especially, of the axial staggering of the two groups of struts and of the varying lengths of these struts when going from one group to the other. In the above-described arrangements, the various deformations resulting from these constraints may, however, take their course freely without compromising the coincidence of the inner body with the longitudinal axis of the whole assembly.

If, for instance, consideration is given to the struts 15 of one of the groups, it will be seen that an expansion of the said struts is translated, to put it shortly, into a purely axial displacement (towards the right in FIG. 2) of the central fitting 12, 13. An expansion of the struts 20 of the other group likewise only brings with it an axial displacement of the peripheral fitting 16, 17, 18. The sleeve 11, rigid with the central fitting, slides along the mandrel 10 in such a manner that axial displacements of the said fitting entail no repercussions on the inner body. Axial displacements of the peripheral fitting are, on the other hand, transmitted through the agency of the truncated-cone element 23 and of the rods 24 to the inner body, which is consequently in its turn only subjected to a purely axial displacement.

In the case in which the axial displacements of the central fitting and of the peripheral fitting are equal, the assembly 2 shifts without becoming deformed. In the most general case, in which these displacements differ from each other, the assembly 2 is able to undergo deformation by virtue of the deformable diaphragms 21, 22 in such a manner that its section, taken through an axial plane, assumes the appearance of a deformable parallelogram. The corrugations 21a, 22a render it possible to absorb the warping constraints which arise in the diaphragms in the course of the relative displacement of the two fittings, by reason of the invariable direction of the connections between the said diaphragms and these fittings.

It will therefore by seen that the differential expansions of the two groups of struts 15, 20 are only translated, to put it shortly, into a relative axial travel of the two fittings of the intermediate supporting structure, and in no case can they bring about deformations of the centrebody or of the struts, the latter not being urged to extend or to yield to axial compression through any thermal effects. Their variations in length and any deformations of the outer casing that may occur under the action of heat take place freely and in no case compromise the correct centring of the inner body.

It will likewise be seen that the sliding mounting of the sleeve 11 on the mandrel 10 and the hinged mounting of the small rods 24 on the inner body and on the intermediate supporting structure allow for a certain displacement of the inner body. In order to increase the flexibility of the device, it may likewise be envisaged that the attachment points 25 of the struts 15 and 20 on the outer casing can undergo a limited displacement.

In the case in which the mounting arrangement would include a number of groups of struts greater than two, the intermediate supporting structure would be made up of an equal number of parts capable of relative axial displacements, each part carrying the fastenings for a different group of struts.

As has been stated hereinbefore, the arms 26 play no part in the suspension. In order to prevent their interfering with the free expansion of the struts which they enclose or with any possible axial displacement of the inner body there can be provided, in the area of their attachment to the outer casing 1, a certain axial play j evident in FIG. 2, an appropriate sealing system being provided to maintain the fluid-tightness of the said area.

It will be appreciated that the embodiments described are only examples and that it would be possible to modify them without departing from the scope of the invention, as defined by the appended claims. I claim:

1. In a duct assembly comprising an outer casing and an inner body mounted within said casing and spaced therefrom to define an annular space, an arrangement for coaxially securing said inner body to said casing about a geometric axis common to said body and said casing, said arrangement comprising:

an intermediate supporting structure mounted within the inner body, said structure comprising a first and a second part in bearing connection with said inner body, said first and second part being displaceable with respect to one another in the direction of said axis;

and means connecting said intermediate supporting structure with said outer casing, whereby said structure is supported from said outer casing, said connecting means including:

a group of first struts extending across said annular space between said first part of the intermediate supporting structure and the outer casing, each of said first struts having two ends;

means hingedly connecting each of said first struts at one end to said first part of the intermediate supporting structure and at the other end to said outer casing, the two strut ends being spaced in the direction of said geometric axis, whereby the strut is inclined to said axis;

a group of second struts extending across said annular space between said second part of the intermediate supporting structure and the outer casing each of said second struts having two ends; and means hingedly connecting each of said second struts at one end to said second part of the intermediate supporting structure and at the other end to said outer casing, the two strut ends being spaced in the direction of said geometric axis, whereby the strut is inclined to said axis; the hinged connection of said first struts to said first part of the intermediate supporting structure being spaced in the direction of said geometric axis from the hinged connection of said second struts to said second part of said structure.

2. An arrangement according to claim 1, including means mounting said first part of the intermediate supporting structure to slide on the inner body.

3. An arrangement according to claim 2, including a series of rods each of which has two ends, and means hinging each of said rods at one end to said inner body and at the other end to said second part of the intermediate supporting structure.

4. An arrangement according to claim 1, including flexible diaphragms interconnecting said first and said second part of the intermediate supporting structure.

5. An arrangement according to claim 4, wherein the diaphragms are formed with corrugations.

6. An arrangement according to claim 1, wherein said first and said second part of the intermediate supporting structure are each symmetrically shaped about an axis and are each supported with its axis coincident with the geometric axis common to the inner body and the outer casing.

7. An arrangement according to claim 1, wherein the hinged connections of the struts of the two groups to the outer casing are coincident, whereby two struts, one from each group, constitute a pair defining two arms of a triangulated linkage system.

8. An arrangement according to claim 1, wherein the struts of the two groups are respectively connected in an alternating disposition in the peripheral direction around said geometric axis.